United States Patent [19]

Suzuki et al.

[11] Patent Number: 4,833,525
[45] Date of Patent: May 23, 1989

[54] HIGH SPEED COLOR BALANCE ADJUSTING DEVICE CAPABLE OF COMPENSATING FOR A FLICKERING LIGHT SOURCE

[75] Inventors: Masao Suzuki; Seiji Hashimoto; Akihiko Tojo; Tsutomu Takayama; Toshio Kaji, all of Kanagawa, Japan

[73] Assignee: Canon Kabushiki Kaisha, Tokyo, Japan

[21] Appl. No.: 256,103

[22] Filed: Oct. 7, 1988

Related U.S. Application Data

[63] Continuation of Ser. No. 844,824, Mar. 27, 1986, abandoned.

[30] Foreign Application Priority Data

Mar. 29, 1985 [JP] Japan .................................. 60-65953
Mar. 29, 1985 [JP] Japan .................................. 60-65954

[51] Int. Cl.$^4$ ......................... H04N 9/73; H04N 9/04
[52] U.S. Cl. ...................................... 358/29; 358/41; 356/45

[58] Field of Search .................. 358/29, 29 C, 41, 75, 358/80, 909, 161; 356/43, 45, 46, 47, 48; 328/2; 307/311

[56] References Cited

U.S. PATENT DOCUMENTS

| | | | |
|---|---|---|---|
| 4,460,836 | 7/1984 | Tsunekawa et al. | 307/311 |
| 4,584,598 | 4/1986 | Kutaragi | 358/29 C |
| 4,595,946 | 6/1986 | Uehara et al. | 358/29 C |
| 4,751,567 | 6/1987 | Hashimoto | 358/44 |

Primary Examiner—James J. Groody
Assistant Examiner—Robert M. Bauer
Attorney, Agent, or Firm—Toren, McGeady & Associates

[57] ABSTRACT

A device performs color balance adjustment on the basis of color temperature information obtained by adding up measured color information outputs sampled from color sensors which obtain measured color information from an object to be photographed.

32 Claims, 4 Drawing Sheets

HIGH SPEED COLOR BALANCE ADJUSTING DEVICE CAPABLE OF COMPENSATING FOR A FLICKERING LIGHT SOURCE

This is a continuation of application Ser. No. 844,824, filed Mar. 27, 1986 abandoned.

BACKGROUND OF THE INVENTION:

1. Field of the Invention:

This invention relates to an improvement on a color temperature information forming device and an image sensing apparatus.

2. Description of the Prior Art:

In picking up the images of objects by means of an image sensing apparatus, such as an electronic camera, the image of a white object is sometimes reproduced in a colored state due to the spectral sensitivity characteristic of an illumination light source. To avoid this, there has been contrived an automatic follow-up type color balance adjusting device which is arranged to measure the color temperature of a light source and to automatically adjust the color balance in an image sensing apparatus on the basis of information on the measured color temperature.

Figure 1:
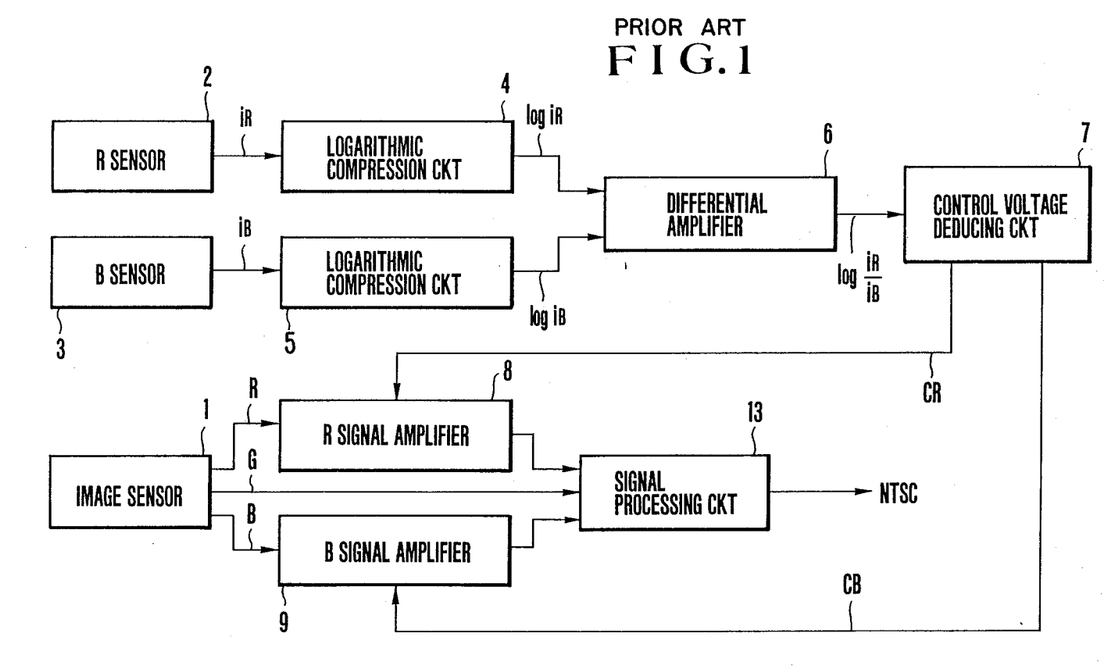
FIG. 1 is a block diagram showing the arrangement of the conventional automatic follow-up type color balance adjustment device.

FIG. 1 of the accompanying drawings shows, in a block diagram, an example of the conventional automatic follow-up type color balance adjusting device. The illustration includes an R sensor 2 and a B sensor 3 which are arranged to have the same red (R) and blue (B) spectral sensitivities as those of an image sensor 1. These color sensors 2 and 3, respectively detect the R and B components of a light obtained from an object to be photographed under a light source. Each of the output signals iR and iB produced from the sensors 2 and 3 varies in a very wide range. Therefore, these signals are logarithmically compressed by logarithmic compression circuits 4 and 5 into signals log iR and log iB. The signals log iR and log iB are converted by a differential amplifier 6 into a difference log signal (iR/iB) representing the ratio between the R and B components of the light coming from the object. A control voltage deducing circuit 7 receives this log signal (iR/iB) from the differential amplifier 6. The circuit 7 then judges the color temperature of the light source on the basis of the ratio between the R and B components and deduces thereby control voltages CR and CB. These control voltages CR and CB control the degree of amplification of amplifiers 8 and 9 which are arranged to amplify signals produced from the image sensor 1 representing the R and B components of the light, respectively. These signals are thus color balance adjusted and then supplied to a signal processing circuit 13. The circuit 13 modulates and multiplexes these signals into the form of a standard TV signal of, for example, the NTSC color system.

In the case of a flickering light source, such as a fluorescent lamp, the flickering of the light takes place at a frequency twice as high as the commercial power supply frequency. In addition, the intensity of one color component of the flickering light differs from that of another. Therefore, the magnitude of the output signal of the differential amplifier 6 also varies to a great extent at a frequency twice as high as the frequency of the commercial power supply. While the flickering does not make much difference for human eyes under a fluorescent lamp light source, the color sensors precisely detect the periodic changes in colors resulting from the flickering of the light source.

To solve the above-stated problem of flicker, video cameras are generally arranged to have an analog low-pass filter inserted in between the differential amplifier 6 and the control voltage deducing circuit 7 for preventing the adverse effect of the flicker. However, in the case of an apparatus such as an electronic camera which must accomplish color balance adjustment in a short period of time after a power supply is switched on, the time constant of the analog low-pass filter is excessively large and the use of it is not appropriate, because the signal component that must be removed is of a low frequency of about 100 Hz. In other words, an apparatus like an electronic camera is occasionally required to take a still picture immediately (in an extremely short period of time) after the power supply is switched on and before the output of the above-stated low-pass filter becomes stable. In such a case, therefore, photo-taking operation is completed before stabilization of the output of the analog low-pass filter after the power supply is switched on. As a result, a picture is obtained before the color balance is adequately adjusted. This has presented a problem.

SUMMARY OF THE INVENTION:

It is a first object of this invention to solve the above-stated problem of the prior art.

It is a second object of this invention to provide an image sensing apparatus which is capable of accomplishing color balance adjustment in a very short period of time.

It is a third object of this invention to provide a color temperature information forming device which is capable of accomplishing color balance adjustment in a very short period of time.

Under these objects, in an image sensing apparatus for obtaining a still picture, a color temperature information forming device, arranged according to this invention as a preferred embodiment thereof, comprises: a plurality of color sensors which form measured color information by detecting different color components of a light coming from an object to be photographed, respectively; and color temperature information forming means for forming color temperature information by sampling the measured color information outputs of the plurality of color sensors in a cycle shorter than $\frac{1}{4}$ of the cycle of a commercial power supply, and by adding up signals obtained through the sampling operation.

It is another object of this invention to provide an image sensing apparatus or a color temperature information forming device which is capable of adequately accomplishing color balance adjustment without being affected by the flicker of a flickery light source, such as a fluorescent lamp.

It is a further object of this invention to provide an image sensing apparatus or a color temperature information forming device which is capable of, even under a light source having a specific spectral component, accomplishing color balance adjustment without being affected by the specific spectral component.

These and further objects and features of this invention will become apparent from the following detailed description of a preferred embodiment thereof taken in connection with the accompanying drawings.

Figure 2:
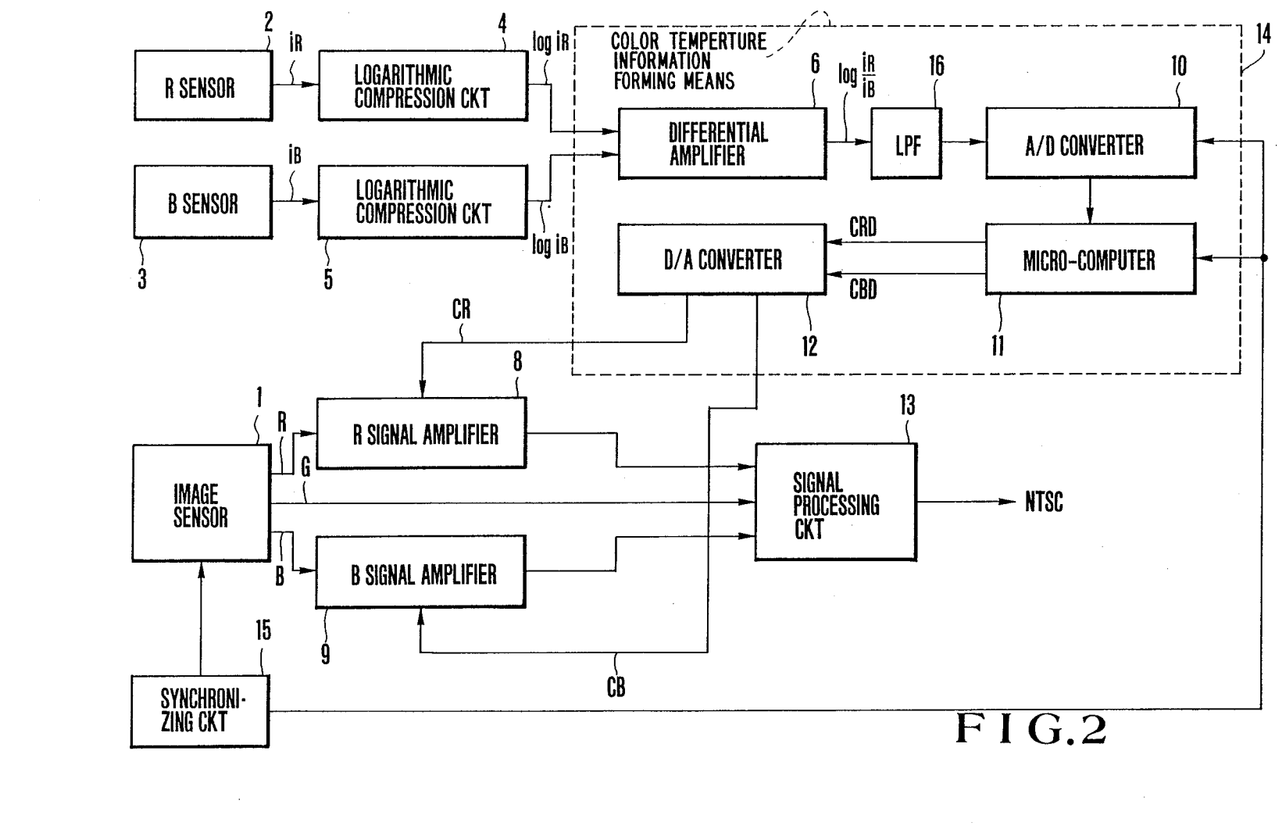
FIG. 2 is a block diagram showing an embodiment of this invention.
Figure 3:
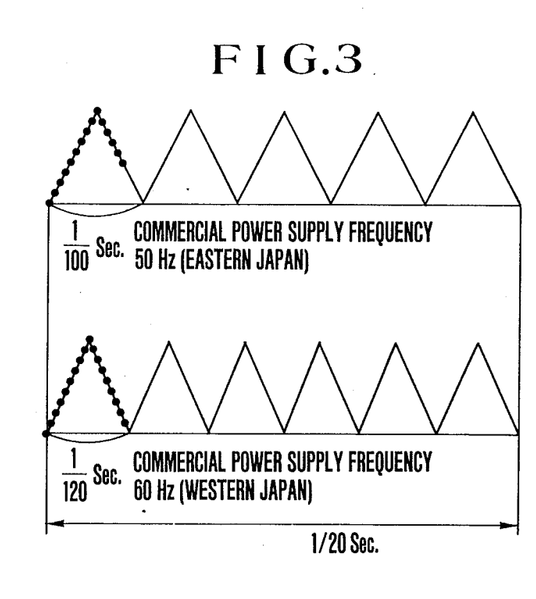
FIG. 3 is a schematic illustration of a flicker showing a method of obtaining an average of the output of a differential amplifier 6 of FIG. 2.

DETAILED DESCRIPTION OF THE PREFERRED EMBODIMENT:

FIG. 2 shows the arrangement of an image sensing apparatus including a color temperature information forming device embodying this invention. The illustration includes an R sensor 2 and a B sensor 3. These sensors have the same red and blue spectral sensitivities as those of an image sensor 1 and are arranged to detect the R (red) and B (blue) components of a light coming from an object to be photographed under a light source. The outputs iR and iB of these sensors 2 and 3 are varying in a very wide range. Therefore, they are logarithmically compressed, respectively, by logarithmic compression circuits 4 and k into signals log iR and log iB. The signals log iR and log iB are supplied to a differential amplifier 6 to be converted into a difference log signal (iR/iB) representing a difference between them. By this, the ratio between the R and B components of the light of the object is obtained.

Figure 4:
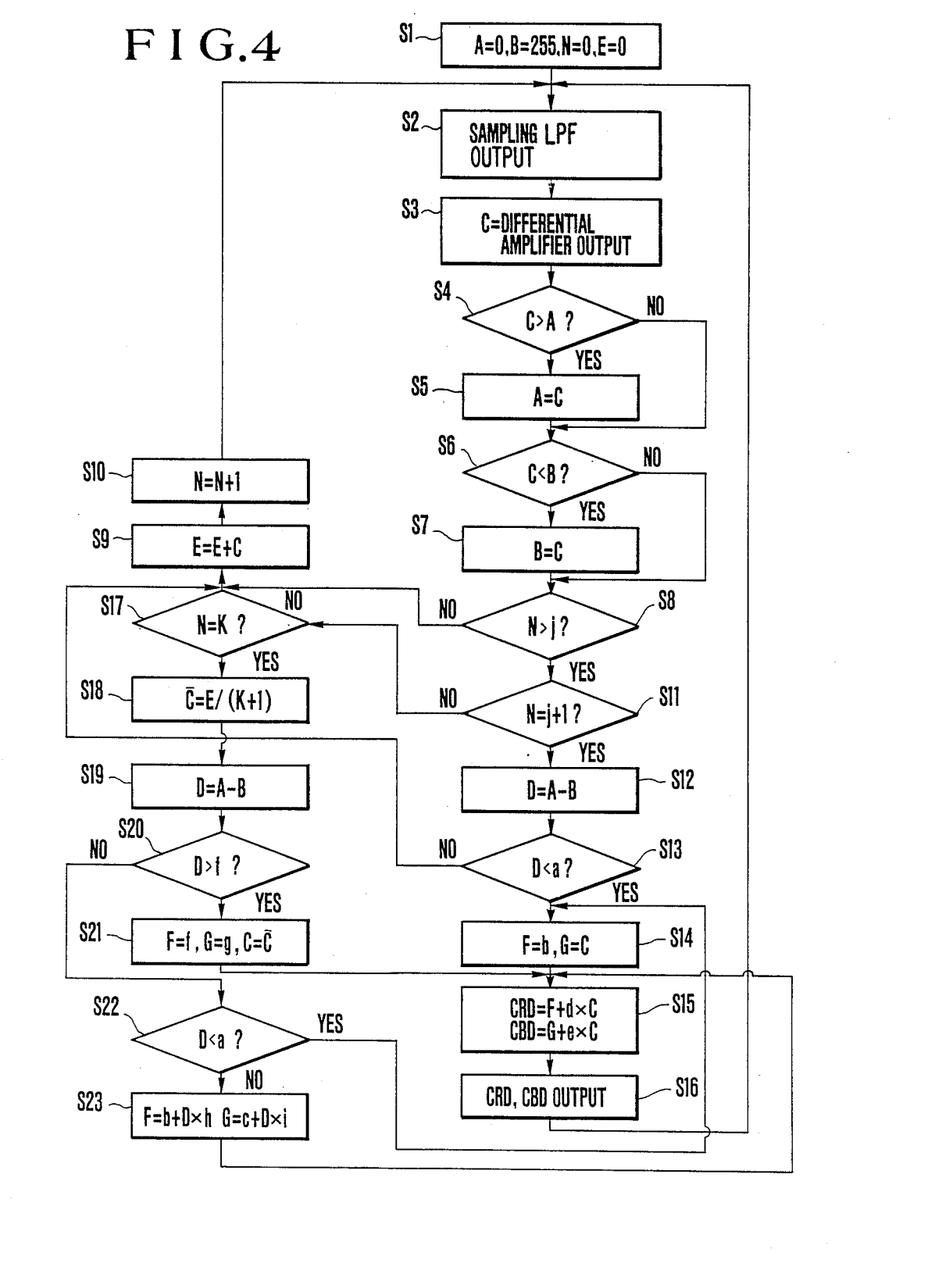
FIG. 4 is a flowchart showing the operation of a microcomputer 11 which is included in FIG. 2.

The output of the differential amplifier 6, which represent the ratio between the R and B components of the object's light, is supplied via a low-pass filter 16 to an A/D converter 10. This input is converted by the A/D converter 10 into a digital signal in synchronism with the output of a synchronizing circuit 15 which forms a synchronizing signal for driving the image sensor 1. By this arrangement, the output of the converter 10 is an intermittently sampled signal. In this instance, the sampling cycle is arranged to be in the following relation to the frequency fs of a commercial power supply: The flicker component of the power supply depends on the absolute value of the polarity thereof. Therefore, the frequency of the flicker component becomes 2 fs. For sampling this frequency 2 fs, a sampling frequency of at least 4 fs is necessary according to the sampling theorem of Nyquist. Accordingly, the value of the sampling cycle must be smaller than 1/(4 fs). In actuality, however, the sampling cycle is preferably shorter than 1/(16 fs) because the flicker component spreads to an extent close to a quartic harmonic. The signal produced from the A/D converter 10 is subjected to a computing process at a microcomputer 11 also in synchronism with the output of the synchronizing circuit 15. As a result, digital control value signals CRD and CBD are produced from the microcomputer 11. The microcomputer 11 comprises a CPU, a RAM and a ROM which stores such procedures that are as shown in FIG. 4. The digital control value signals thus obtained are supplied from the microcomputer 11 to a D/A converter 12. The converter 12 converts these signals into analog control value signals CR and CB, which are then supplied to an R signal amplifier 8 and a B signal amplifier 9, respectively. The amplifying degrees of the amplifiers 8 and 9, which are arranged to amplify the signals coming from the image sensor 1 representing the R and B components of the object's light, are controlled by the control value signals CR and CB, respectively, in such a way as to accomplish color balance adjustment. A block 14 represents the color temperature information forming means. The microcomputer 11 performs the following two computing operations (1) and (2):

(1) A computing operation for removing an adverse effect of periodic changes which take place in the output of the differential amplifier 6 indicative of the ratio between the R and B components of the object's light.

(2) A computing operation for correcting the control signals according to the result of measurement of the extent (amplitude) of the above-stated changes.

The computing operation (1) is carried out in the following manner: The frequency component, representing the extent of the periodic changes of the output of the differential amplifier 6, consists of a basic wave 2 fs, which is twice as high as the commercial power supply frequency, and the primary, secondary, tertiary, quartic, harmonics of the basic wave. It is therefore apparent that the varying portion (or the extent of the changes) can be removed by obtaining the average of the output of the differential amplifier 6 produced during a period of 1/(2 fs) second. In Japan, however, the commercial power supply frequency is 50 Hz in eastern Japan and 60 Hz in western Japan. Therefore, the period 1/(2 fs) sec. is 1/100 sec. in eastern Japan while it is 1/120 sec. in western Japan. The values in the two parts of Japan thus differ from each other. In this instance, if the above-stated average is obtained for the period of 1/120 sec., the average is precisely obtainable and the portion representing the periodic changes or variations of the output of the differential amplifier 6 can be removed for western Japan but not for eastern Japan, because the basic wave has not come to the end of one period in the latter case. However, if the average for period of 1/20 sec. is adopted, it covers five periods of the basic wave for eastern Japan and six periods of the basic wave for western Japan. Therefore, no period is left uncompleted within the period of time 1/20 sec. Accordingly, the average can be always accurately obtained by setting the average value obtaining period at this period of 1/20 sec. The periodic varying or changing portion of the output of the differential amplifier 6 thus can be removed in 1/20 sec., i.e. 50 ms. In other words, a control signal from which the above-stated varying portion is removed can be obtained in a shorter period of time than the conventional arrangement of using an analog low-pass filter for that purpose.

Next, in the computing operationg (2) mentioned above, the amplitude of the periodic changing portion in the output of the differential amplifier 6 is obtained. Then, using the amplitude value thus obtained as a function, the amplifying degree for a G (green) component relative to the amplifying degree for the R and B components of the signal (video signal) obtained from the image sensor 1 is determined. After that, the control signal is corrected in such a way as to have the relative amplification degree for the G component become the value thus determined. The reason for this is as follows: In the case of the apparatuses of the kind shown in FIGS. 1 and 2, two color sensors are employed including the R (red) and B (blue) sensors. Therefore, no information is obtained on the G (green) component of the light source. Heretofore, a black body radiation which is close to the sunlight has been employed as a datum. In that instance, once the ratio between the R and B components is obtained, the ratio of the G component to them is also obtainable. It has been thus possible to predict the ratio of the G component from the ratio between the R and B components. Whereas a light source, such as a fluorescent lamp, has a specific spectrum which makes it hardly possible to predict the ratio of the G component. Therefore, it has been hardly possible to adequately correct the G component for a light source such as a fluorescent lamp. Hence, the picture which is reproduced under such a condition has been affected by a green color. This problem is serious as fluorescent lamps are being used as a light source to a considerable extent. In view of this problem, this specific embodiment of the invention is arranged on the assumption that, in the event of a large amplitude of the periodic changing portion in the output of the differential amplifier 6, a fluorescent lamp or lamps are solely used as a light source, for example. In other words, in such a case, correction is accomplished in such a way as to make the ratio of the G component smaller in the video signal. In the event of a small amplitude of the periodic changing portion, it is assumed that sunlight or the like, flickering to a less degree, is in use as the light source and the correction is accomplished to make the ratio of the G component greater in the video signal. In cases where a fluorescent lamp and sunlight coexist as a light source, the amplitude of the periodic changing portion in the output of the differential amplifier 6 corresponds to the ratio between the light quantity from the fluorescent light and the light quantity from sunlight. In that event, therefore, the embodiment adjusts the ratio of the G component to the R and B components in the video signal with the amplitude value of the periodic changing portion used as a function for the adjustment.

FIG. 4 shows, in a flowchart the actual operation of the embodiment carried out by the microcomputer 11. In the case of FIG. 4, the A/D and D/A converters and the microcomputer are assumed to perform 8-bit processing operations, respectively. Referring to FIG. 4, at a step S1, initial values $A=0$, $B=255$, $N=0$ and $E=0$ are respectively set at given regions (registers) A, B, N and E of a RAM within the microcomputer. At a step S2, the output of the differential amplifier, after being low-pass filtered is sampled by the A/D converter. At a step S3, the digital value of the sampled low-pass filtered output of the differential amplifier is set at the region C of the RAM within the microcomputer. At a step S4, the value C thus obtained is compared with the value A (the initial value of which is 0). If the value C is larger than the value A, then the operation proceeds to a step S5. At the step S5, the value A is replaced with the value C. In other words, the value A then shows the maximum value of the sampled output. If the value A is found larger than the value C, then the operation proceeds to a step S6. At the step S6, the value C is compared with the value B (the initial value of which is 255). If the value C is found to be smaller than the value B, then the operation proceeds to a step S7. At the step 7, the value B is replaced with the value C. In other words, the value B then shows the minimum value of the sampled output. If the value B is smaller than the value C, then the operation proceeds to a step S8. At the step S8, if the value N (the initial value of which is 0) is smaller than a predetermined value j, then the operation proceeds to a step S9. At the step S9, the value E (the initial value of which is 0) is added to the value C to make the value E represent the sum of the values E and C. The operation further proceeds to a step S10. At the step S10, the value N is increased by 1. Following that, the operation returns to the step S2. At the step S2, again the low-pass filtered output of the differential amplifier is sampled. These steps S2 to S8, S9 and S10 are repeated until the value N becomes larger than the value j. When the value N becomes larger than the value j at the step S8, the operation proceeds to a step S11. At the step S11, it is determined whether or not $N=j+1$. If so, then the operation proceeds to a step S12. At the step S12, a difference D ($D=A-B$) between the largest and smallest values of the sampled output is detected. At a next step S13, this difference value D is compared with a predetermined value a. If the value D is found to be smaller than the value a, then the low-pass filtered output of the differential amplifier is judged to have no periodic changing portion included therein. The operation then proceeds to a step S14. At the step S14, a predetermined value b is set at a region F of the RAM within the microcomputer and another predetermined value c at another region G of the RAM. The operation then proceeds to a step S15, at which control voltages CRD and CBD are obtained, on the assumption that the light source is sunlight or the like, requiring no correction of the green component, according to formulas $CRD=F+d \times C$ and $CBD=G+e \times C$ (wherein C represents the latest sampled output of the differential amplifier), respectively. After that, the operation proceeds to a step S16, at which the control voltages CRD and CBD thus obtained are supplied to the D/A converter. Then, the operation returns to the step S2. Thus, in the case of a light source such as sunlight or the like, that requires no green correction, the control voltages are produced on the basis of the latest data.

The value j is obtained in the following manner: Since the amplitude of the periodic change portion in the output of the differential amplifier must be obtained before $N=j+1$ (by repeating the steps S2 to S10), the value j must be applicable to the timing corresponding to a point of time at which one period of the basic wave comes to an end. Therefore, with the sampling clock pulse frequency at the A/D converter assumed to be 1 KHz and the commercial power supply frequency to be 1/(50 c/s), the number of times for which the sampling operation must be repeated becomes $1/100s \div 1/1000s = 10$ times. Therefore, the value j becomes $j=8$.

At the step S13, if the amplitude of the periodic change portion of the output of the differential amplifier obtained by sampling it 10 times is larger than the predetermined value a, then the operation proceeds to a step S9. At the step S9, the value C is added to the value E. Then, at a step S10, the value N is increased by 1. The operation then returns to the step S2 and the low-pass filtered output of the differential amplifier is again sampled.

The operation proceeds from the step S3 to the step S11. Since the value is above a value $j=1$ in this instance, the operation proceeds to a step S17. At the step S17, it is determined whether the value N is equal to a value K. In other words, assuming that the sampling cycle is 1 KHz, the sampling operation is repeated 50 times until the value N reaches the value K, that is, until the lapse of the time 1/20 sec., with the value C further added to the value E. The steps S2 to S8, S17, S9 and S10 are thus repeatedly carried out in that order. When the value N reaches the value K at the step S17, the value E is divided by a value $K+1$ to obtain an average value of the output of the differential amplifier. In other words, a value $\overline{C}$, from which the periodic change portion is removed, is thus obtained. Following that, the operation proceeds to a step S19 to obtain the amplitude value $D=A-B$. At a next step S20, it is determined whether the value D is larger than a predetermined value f. If so, the light source is judged to be consisting solely of a fluorescent lamp or lamps. The operation then proceeds to a step S21, at which the G component of the video signal is adjusted or weakened relative to the R and B components. More specifically, in the case of the image sensing apparatus of the kind having R and B component processing circuits, for example, there is no circuit for changing the gain of the G component. In that instance, the rate of the R and B components is increased relative to the G component by causing the values F and G to become $F=f$ and $G=g$ (wherein f and g represent predetermined values) and the value C to become the value $\overline{C}$, respectively. After that adjustment, the operation proceeds to the step S15. In case that the value D is found to be smaller than the value f at the step S20, the operation proceeds to a step S22 to find whether the value D is smaller than the value a. If so, the operation returns to the step S14 to correct the control voltage on the assumption that the light source is sunlight in the same manner as described in the foregoing. Further, if the value D is found to be larger than the value a, the light source is judged to be a mixture of sunlight and a fluorescent lamp. Then, the operation proceeds to a step S23, at which computing operations $F=b+D\times h$ (h: a predetermined value) and $G=c+D\times i$ (i: a predetermined value) to obtain the linear function for the amplitude D. The operation then returns to the step S15 to obtain the control voltages CRD and CBD there.

There are some conceivable means other than the arrangement described above for removing the periodic change portion from the output of the differential amplifier. In the specific embodiment described, sampling is arranged to be performed for the period of 1/20 sec. for the purpose of accurately obtaining an average for both eastern and western Japan. However, this arrangement may be changed as follows: For example, if the period of the sampling frequency is arranged to be 1/1200 sec., one cycle comes to an end at the 12th performance of sampling and the same sampled value is then obtained as the first sampled value in eastern Japan. In western Japan, the sampled value becomes the same as the first sampled value at the 10th performance of sampling. Then, with the 10th sampled value compared with the first one, if the two values are found equal to each other, it indicates the power supply of western Japan and an average value of the output of the differential amplifier is obtained at that point of time. If the two values are found not equal to each other, it indicates the power supply of eastern Japan and the sampling is further repeated two more times before taking an average value. This arrangement permits quicker color balance adjustment, because: The change or varying portion of the output of the differential amplifier can be removed in 1/120 sec. in western Japan and in 1/100 sec. in eastern Japan, instead of 50 ms.

In the event of a low sampling frequency (such as 900 Hz), the high zone component (above 450 Hz, for example) of the higher harmonics of 1/(2 fs) in the output of the differential amplifier might become folded. To avoid this, the embodiment is arranged to remove the high zone component through the analog low-pass filter 16 before the sampling operation. This arrangement effectively reduces noises. This low-pass filter 16 serves as band limiting means. Therefore, the same advantageous effect is also attainable by using a band-pass filter or a trap circuit in place of the low-pass filter. In particular, the low-pass filter 16 is used for the sole purpose of preventing folding back distortion. The time constant of the filter, therefore, is much smaller than that of the low-pass filter conventionally used for the purpose of averaging the output of the differential amplifier. Therefore, adequate control voltages can be obtained in a very short period of time.

The flicker of the light source naturally brings about some adverse effect also on the image sensor or a camera tube which forms a part of the image sensing apparatus. As a result, the image signal itself has flickering colors. In the case of an image sensor such as a CCD, electric charge is accumulated for a given period of time. Therefore, the adverse effect of the flicker can be reduced in the same manner as in obtaining the average of the output of the differential amplifier as described in the foregoing. In case that the invented arrangement is applied to an electronic camera having a shutter, the accumulating time at the CCD becomes shorter depending on the shutter. In that instance, flicker correction solely by means of the color balance adjustment device cannot prevent the flicker of the image signal and the operation of the color balance adjustment device would become meaningless. To solve this problem, in the color balance adjustment device, the period during which the average of the output of the differential amplifier is obtained is synchronized with the electric charge accumulating time of the CCD. The flicker then can be effectively corrected by that arrangement. It is a feature of this embodiment that, with this taken into consideration, the sampling timing is synchronized with the timing at which the driving scanning operation is performed on the image sensor 1.

Further, for correcting the green component of the video signal, the kind of the light source is detectable from the ratio between the R and B components obtained from the R and B sensors. For example, the light source is judged to be an indoor fluorescent lamp when the ratio R/B exceeds 1.5, to be a tungsten light source when it is above 2.5, and to be outdoor sunlight when it is less than 1.5. Then, the green component is adjusted accordingly.

In the embodiment described, the color balance adjusting device includes a color temperature information forming device. However, the color temperature information forming device may be arranged to merely display color temperature information or to give a warning relative to color temperature.

Further, in the embodiment, the color temperature information forming means is arranged to form the color temperature information by carrying out a subtracting operation on the logarithmically compressed values of the outputs of the R and B sensors. However, this may be replaced with some arrangement to simply compute the ratio between the outputs of these two sensors.

In accordance with this invention, as described in the foregoing, adequate color temperature information can be obtained in a short period of time even under a flickery light source such as a fluorescent lamp or under a mixture of such a light source and sunlight.

What is claimed is:

1. A color temperature information forming device, comprising:
   (a) color temperature signal producing means which detects colors of an object and produces a color temperature signal according to the detected colors;
   (b) sampling means for sampling said color temperature signal at predetermined time intervals;
   (c) means for preventing folding distortion from arising at the time of said sampling, said preventing means being disposed before said sampling means; and
   (d) computing means for performing a computation on said sampled color temperature signal samples.

2. A device according to claim 1, wherein said computing means is arranged to compute and obtain an average value of a plurality of said sampled color temperature signal samples.

3. A device according to claim 1, wherein said color temperature signal producing means is arranged to detect different color components of light of said object and to produce a signal corresponding to a ratio between said detected color components.

4. A device according to claim 1, wherein said color temperature signal are logarithmically compressed signal.

5. A device according to claim 4, wherein said color temperature signal are obtained by logarithmically compressing a ratio between red and blue components of the light of said object.

6. A device according to claim 1, wherein said computing means is arranged to perform a computation on said sampled color temperature signal samples sampled during a length of time which is an integer number times as long as a period at which a fluorescent light flickers.

7. A device according to claim 6, wherein said computing means is arranged to compute and obtain an average value of said sampled color temperature signal samples.

8. A device according to claim 6, wherein said color temperature signal producing means is arranged to detect different color components of light of said object and to produce a signal corresponding to a ratio between said detected color components.

9. A device according to claim 1, wherein said sampling means is arranged to perform sampling in a cycle shorter than ½ of a flickering cycle of a flickering light source.

10. A device according to claim 9, wherein said color temperature signal producing means is arranged to detect different color components of light of said object and to produce a signal corresponding to a ratio between said detected color components.

11. An image sensing apparatus comprising:
    (a) means for converting an image of an object to be photographed into a video signal including a plurality of color components;
    (b) color temperature signal producing means arranged to detect colors of said object's image and to produce a color temperature signal corresponding to said detected colors;
    (c) sampling means for sampling said color temperature signal at predetermined time intervals;
    (d) means for preventing a folding distortion from arising during said sampling, said preventing means being disposed before said sampling means;
    (e) computing means for performing a computation on said sampled color temperature signal samples; and
    (f) control means for controlling a ratio between said plurality of color components of said video signal on the basis of the result of said computation performed by said computing means.

12. An apparatus according to claim 11, wherein said computing means is arranged to compute and obtain an average value of a plurality of said sampled color temperature signal samples.

13. An apparatus according to claim 11, wherein said color temperature signal producing means is arranged to detect different color components of light of said object and to produce a signal corresponding to a ratio between said detected color components.

14. An apparatus according to claim 11, wherein said color temperature signal are logarithmically compressed signal.

15. An apparatus according to claim 14, wherein said color temperature signal are obtained by logarithmically compressing a ratio between red and blue components of the light of said object.

16. An apparatus according to claim 11, wherein said computing means is arranged to perform said computation on said sampled color temperature signal samples during a length of time which is an integer number times as long as a period at which a fluorescent light flickers.

17. An apparatus according to claim 16, wherein said computing means is arranged to compute and obtain an average value of said sampled color temperature signal samples.

18. An apparatus according to claim 16, wherein said color temperature signal producing means is arranged to detect different color components of light of said object and to produce a signal corresponding to a ratio between said detected color components.

19. An apparatus according to claim 11, wherein said sampling means is arranged to perform sampling in a cycle shorter than ½ of the flickering cycle of a flickering light source.

20. An apparatus according to claim 19, wherein said color temperature signal producing means is arranged to detect different color components of light of said object and to produce a signal corresponding to a ratio between said detected color components.

21. An apparatus according to claim 11, wherein said control means includes:
    (a) amplifying means for amplifying said plurality of color components of said video signal; and
    (b) means for controlling the degree of amplification by said amplifying means on the basis of the result of said computation performed by said computing means.

22. An apparatus according to claim 21, wherein said amplifying means is arranged to amplify red and blue components of said video signal.

23. An image sensing apparatus comprising:
    (a) means for converting an image of an object to be photographed into a video signal including a plurality of color components;
    (b) color temperature signal producing means arranged to detect colors of said object's image and to produce a color temperature signal corresponding to said detected colors;
    (c) sampling means for sampling said color temperature signal at predetermined time intervals;

(d) computing means for performing a computation on said sampled color temperature signal samples;

(e) control means for controlling a ratio between said plurality of color components of said video signal on the basis of the result of said computation performed by said computing means; and (f) synchronizing means for synchronizing said sampling by said sampling means and a converting operation of said converting means.

24. An apparatus according to claim 23, wherein said synchronizing means determines a converting period of said converting means.

25. An apparatus according to claim 23, further comprising means for preventing a folding distortion from arising at the time of sampling.

26. An apparatus according to claim 23, wherein said computing means is arranged to compute and obtain an average value of a plurality of said sampled color temperature signal samples.

27. An apparatus according to claim 23, wherein said color temperature signal producing means is arranged to detect different color components of light of said object and to produce a signal corresponding to a ratio between said.

28. An apparatus according to claim 23, wherein said color temperature signal are logarithmically compressed signal.

29. An apparatus according to claim 28, wherein said color temperature signals are obtained by logarithmically compressing a ratio between red and blue components of the light of said object.

30. An apparatus according to claim 23, wherein said computing means is arranged to perform a computation on said sampled color temperature samples during a length of time which is an integer number times as long as a period at which a fluorescent light flickers.

31. An apparatus according to claim 30, wherein said computing means is arranged to compute and obtain an average value of said sampled color temperature signal samples.

32. An apparatus according to claim 23, wherein said sampling means is arranged to perform sampling in a cycle shorter than $\frac{1}{2}$ of a flickering cycle of a flickering light source.

* * * * *

UNITED STATES PATENT AND TRADEMARK OFFICE
CERTIFICATE OF CORRECTION

PATENT NO. : 4,833,525

DATED : May 23, 1989

INVENTOR(S) : Masao Suzuki et al

It is certified that error appears in the above-identified patent and that said Letters Patent is hereby corrected as shown below:

Column 9, line 25;
    claim 4, line 2, change "are" to -- is --.

Column 9, line 28;
    claim 5, line 2, change "are" to -- is --.

Column 10, line 18;
    claim 14, line 2, change "are" to -- is --.

Column 10, line 21;
    claim 15, line 2, change "are" to -- is --.

Column 12, line 4,
    claim 28, line 2, change "are" to -- is --.

Column 12, line 7,
    claim 29, line 2, change "signals are" to -- signal is --.

Signed and Sealed this

Third Day of April, 1990

Attest:

HARRY F. MANBECK, JR.

*Attesting Officer*    *Commissioner of Patents and Trademarks*

UNITED STATES PATENT AND TRADEMARK OFFICE
Certificate

Patent No. 4,833,525                                              Patented: May 23, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:

Masao Suzuki, Seiji Hashimoto and Akikiko Tojo

Signed and Sealed this Twentieth Day of November 1990.

JAMES J. GROODY

*Supervisory Ptent Examiner*
*Art Unit 262*